(12) United States Patent
Watanabe (10) Patent No.: US 9,438,783 B2
(45) Date of Patent: Sep. 6, 2016

(54) AUTOMATIC TRACKING CONTROL APPARATUS FOR CAMERA APPARATUS AND AUTOMATIC TRACKING CAMERA SYSTEM HAVING SAME

(75) Inventor: Harukazu Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 734 days.

(21) Appl. No.: 13/451,616

(22) Filed: Apr. 20, 2012

(65) Prior Publication Data

US 2012/0268608 A1    Oct. 25, 2012

(30) Foreign Application Priority Data

Apr. 20, 2011 (JP) ................. 2011-093636

(51) Int. Cl.
*H04N 5/232* (2006.01)
(52) U.S. Cl.
CPC .......... *H04N 5/232* (2013.01); *H04N 5/23219* (2013.01)
(58) Field of Classification Search
CPC .......................... H04N 5/23219; H04N 5/232
USPC .......................................... 348/169
See application file for complete search history.

(56) References Cited

U.S. PATENT DOCUMENTS

| 8,174,580 | B2 * | 5/2012 | Hayashi | ................. | H04N 5/232 348/169 |
| 2004/0100563 | A1 * | 5/2004 | Sablak | ..................... | H04N 5/77 348/211.4 |
| 2009/0096871 | A1 * | 4/2009 | Kuwano et al. | .............. | 348/169 |

FOREIGN PATENT DOCUMENTS

| JP | 5028923 A | | 2/1993 |
| JP | 2002191046 A | | 7/2002 |
| JP | 2004-096292 A | | 3/2004 |
| JP | 2006229321 A | | 8/2006 |
| JP | 2010081041 A | * | 4/2010 |

OTHER PUBLICATIONS

Office Action issued in JP2011-093636, mailed Feb. 26, 2015.
Japanese Office Action issued in counterpart application No. JP2011093636, dated Dec. 1, 2015.

* cited by examiner

*Primary Examiner* — Tung Vo
*Assistant Examiner* — Rowina Cattungal
(74) *Attorney, Agent, or Firm* — Rossi, Kimms & McDowell LLP (57) ABSTRACT

An automatic tracking control apparatus for a camera apparatus having a panning or tilting function, comprising an object recognition unit to recognize an object in picked-up image, a tracking object setting unit to set the recognized object as tracking object, an output position setting unit to set a position in the image for outputting the image of the tracking object, a control computing unit to output drive signal to locate the tracked object at the output position, and an image output unit to output an image in which an indication of the tracking object is superimposed on the image. Automatic tracking is suspended to change the position of the tracking object in the image by the output position setting unit, and automatic tracking is restarted by outputting a drive signal for driving the camera apparatus to locate the tracked object at the output position.

8 Claims, 8 Drawing Sheets

AUTOMATIC TRACKING CONTROL APPARATUS FOR CAMERA APPARATUS AND AUTOMATIC TRACKING CAMERA SYSTEM HAVING SAME

BACKGROUND OF THE INVENTION

1. Field of the Invention

The present invention relates to an automatic tracking control apparatus for a camera apparatus having the function of panning and/or tilting and the function of automatically tracking a specific object as the object to be tracked. The present invention also relates to an automatic tracking camera system having the same.

2. Description of the Related Art

There are cameras equipped with electric camera platform with which the camera can be swung (or panned and tilted). An operation unit is coupled to such a camera equipped with electric camera platform by cable or wireless connection to allow remote operation of the camera platform and the camera. An operator observes the image displayed on a monitor screen and operates the operation unit to control the camera and the camera platform.

In recent years, automatic tracking camera systems using image recognition technology in a camera with electric camera platform to track an object have been developed. In such systems, when automatic tracking is enabled, the pan/tilt operation of the camera platform is performed in such a way that the image of the object to be tracked is located at a designated position on the monitor screen.

Japanese Patent Application Laid-Open No. H05-028923 teaches to obtain the difference between the coordinates of the center of the monitor and the coordinates of the position of an object and to control the pan and tilt angles of a rotary table in such a way as to shift the object to the center of the image so that the object is displayed at the center of the monitor screen. Japanese Patent Application Laid-Open No. 2004-096292 discloses means for replacing a template of the object to be tracked by an operation unit during tracking and for shifting a new object to the center of the image.

When a reporter or announcer is to be automatically tracked in shooting in a TV station, it is sometimes desired during tracking to change the initially set position at which the object is to be displayed in the image. For example, when the subject person is holding a flip board or article, it might be desired to locate the flip board or article at the center of the image or to locate the person in, for example, the rightmost or leftmost region of the image.

However, in the technology disclosed in Japanese Patent Application Laid-Open No. H05-028923, the object is controlled to be output (or displayed) at substantially the center of the image after the tracking is started, and the position in the image at which the object is output cannot be changed arbitrarily after the tracking is started.

In the technology disclosed in Japanese Patent Application Laid-Open No. 2004-096292, although the object to be tracked can be changed during tracking by replacing the template with a new one, the object cannot be shifted to a desired position in the image.

SUMMARY OF THE INVENTION

An object of the present invention is to eliminate the above-described problems and provide a control apparatus for automatic tracking camera that allows an operator to change the position in the image frame at which the object is to be output (or displayed) by a simple operation during automatic tracking.

According to a mode of the present invention, there is provided an automatic tracking control apparatus for a camera apparatus having a panning and/or tilting function comprising an object recognition unit configured to recognize an object in a picked-up image from the camera apparatus, a tracking object setting unit configured to set the object recognized by the object recognition unit as an object to be tracked, an output position setting unit configured to set an output position, which is a position in the picked-up image at which the object to be tracked is to be output, a control computing unit configured to output to the camera apparatus a drive signal for driving the camera apparatus to pan and/or tilt in such a way that the object to be tracked is located at the output position set by the output position setting unit; and an image output unit that outputs an image in which an indication for distinguishing the object to be tracked from another object is superimposed on the picked-up image, wherein when the output position is to be changed during automatic tracking, automatic tracking is suspended, the camera apparatus is driven to change the position of the object to be tracked in the picked-up image, the position of the object to be tracked in the picked-up image is set as an updated output position by the output position setting unit, and automatic tracking is restarted by outputting, by the control computing unit to the camera apparatus, a drive signal for driving the camera apparatus in such a way that the object to be tracked is located at the updated output position.

According to another mode of the present invention, there is provided an automatic tracking control apparatus for a camera apparatus having a panning and/or tilting function, comprising an object recognition unit configured to recognize an object in a picked-up image from the camera apparatus, a tracking object setting unit configured to set the object recognized by the object recognition unit as an object to be tracked, an output position setting unit configured to set an output position, which is a position in the picked up image at which an image of the object to be tracked is to be output, a control computing unit configured to output to the camera apparatus a drive signal for driving the camera apparatus to pan and/or tilt in such a way that the object to be tracked is located at the output position set by the output position setting unit, an image output unit configured to output an image in which an indication for distinguishing the object to be tracked from another object and a mark to be used to reset the output position are superimposed on the picked-up image, and an output position resetting unit configured to shift the position of the mark in the picked-up image and to set the position of the mark as an updated output position, wherein when the output position is to be changed during automatic tracking, the mark is shifted in the picked-up image by the output position resetting unit to set the updated output position, and the control computing unit outputs to the camera apparatus a drive signal for driving the camera apparatus in such a way that the image of the object to be tracked is output at the updated output position.

The control apparatus for automatic tracking camera, and the automatic tracking camera system according to the present invention allow an operator to change the position on the screen at which the image of the object is to be output by a simple operation during automatic tracking.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
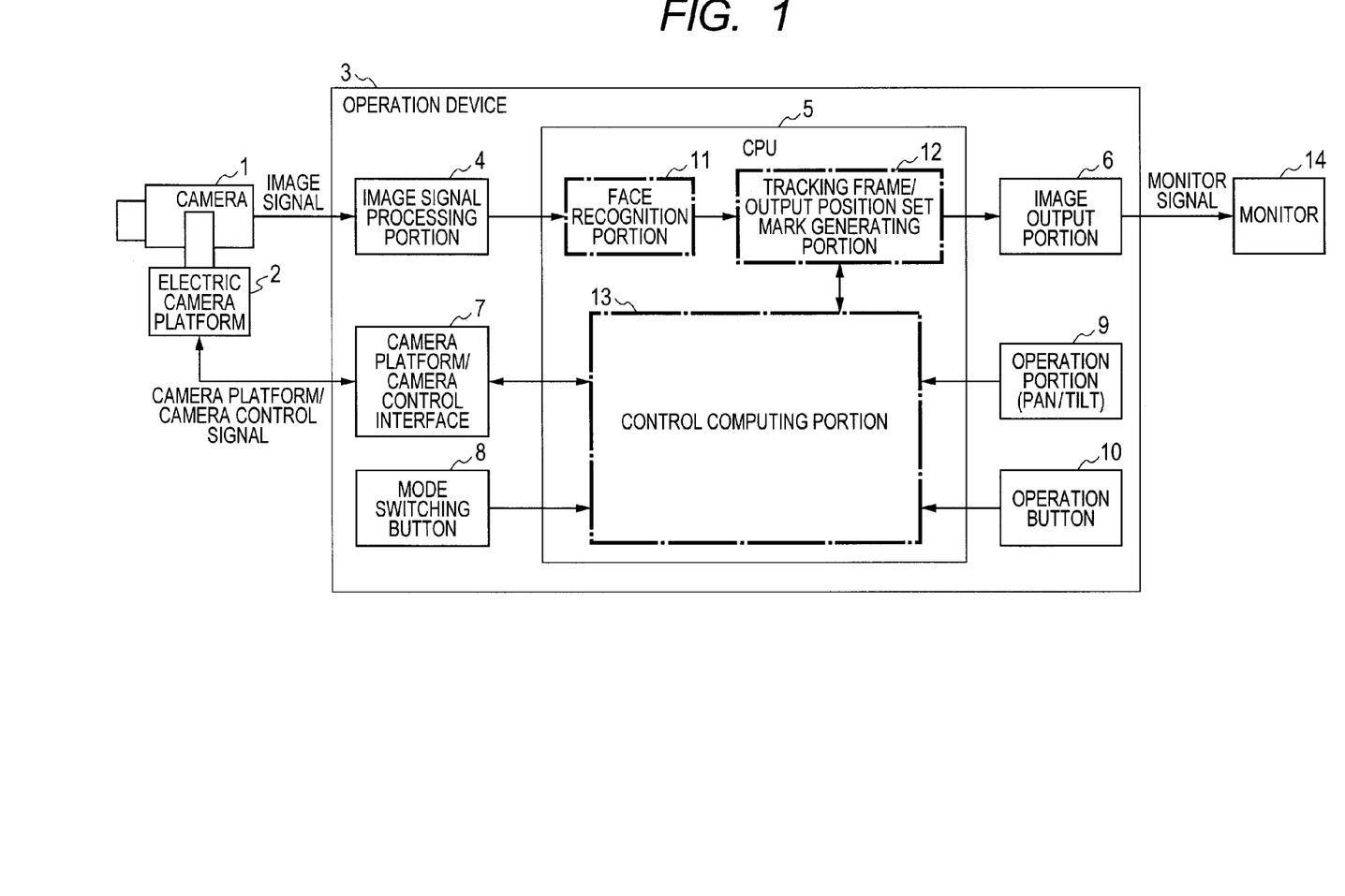
FIG. 1 is a diagram showing the basic configuration of a system according to a first embodiment.

FIG. 1 is a diagram showing the configuration of an automatic tracking control apparatus for a camera apparatus having the function of panning or tilting according to a first embodiment. Here and in the following, "or" in the expression "panning or tilting" and its derivatives refers to an inclusive or and not to an exclusive or. Namely, "panning or tilting" means "panning and/or tilting" and "to pan or tilt" means "to pan and/or tilt". In FIG. 1, a camera 1 with lens having the functions of zooming and focusing is mounted on an electric camera platform 2 that can perform swinging operation including panning and tilting. The camera 1 and the electric camera platform 2 are adapted to allow camera control such as zooming and gain adjustment and camera platform control for panning or tilting by an operation device 3 that is installed remotely from the camera 1 and the electric camera platform 2.

Image signals output from a CCD (image pickup element) of the camera 1 are input to an image signal processing portion 4 of the operation device 3, with which the camera 1 and the electric camera platform 2 on which the camera 1 is mounted are operated in accordance with operations by an operator. The operation device 3 has, in addition to the image signal processing portion 4, a CPU 5, an image output portion 6, a camera platform/camera control interface 7, a mode switching button 8, an operation portion 9 and an operation button 10. The CPU 5 contains a face recognition portion 11 (which constitutes the object recognition unit that recognizes an object), a tracking frame/output position set mark generating portion 12 and a control computing portion 13.

The output of the image signal processing portion 4 is connected to the control computing portion 13 via the face recognition portion 11, the tracking frame/output position set mark generating portion 12. An output of the tracking frame/output position set mark generating portion 12 is also connected to an external monitor 14 outside the operation device 3 via the image output portion 6. Although in this embodiment the operation device 3 is connected with the external monitor, the operation device 3 may be provided with an internal monitor such as a liquid crystal display, to which the signals may be output. The control computing portion 13 is connected with the electric camera platform 2 via the camera platform/camera control interface 7. The outputs of the mode switching button 8, the operation portion 9 and the operation button 10 are also connected to the control computing portion 13.

In the image signal processing portion 4, the input analogue image signals are converted into digital signals, which are input to the face recognition portion 11 in the CPU 5. While in this embodiment tracking of a human figure is performed using a face recognition pattern, other recognition techniques such as color recognition, contour recognition and moving object recognition may be used. The face recognition portion 11 performs face recognition using a face recognition technique such as a template matching method. In this embodiment, a face located close to the center of the image is recognized preferentially. Then, the coordinates of the position of the recognized face of the object S to be tracked in the image are input to the tracking frame/output position set mark generating portion 12, and a tracking object frame Ft (which constitutes a tracking object mark) shown in FIG. 2 is generated based on the coordinates of the position of the recognized face to distinguish the object to be tracked from other objects.

Figure 2:
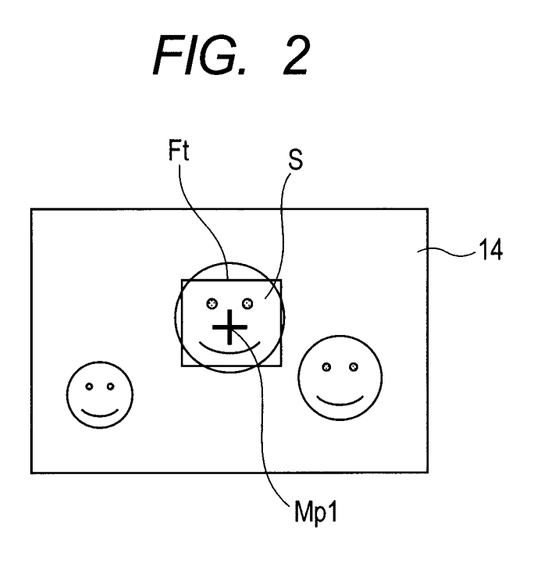
FIG. 2 shows an image on a monitor screen in which a tracking object frame and an output position set frame are displayed.

When the position in the image at which the image of the tracked object S is to be output (or displayed) is set, the output position set mark Mp1 shown in FIG. 2 is generated at the coordinates C1 of the center of the tracking object frame Ft at that time.

The signal in which the tracking object frame Ft and the output position set mark Mp1 have been combined to the input image by the tracking frame/output position set mark generating portion 12 is input to the image output portion 6. The image output portion 6 converts the input signal into the image signal having an image format such as DVI, VGA, NTSC suitable for input to the monitor (display apparatus) 14 as the monitor signal.

The operation portion 9 may be a joystick or an arrow key button on which upward, downward, leftward and rightward arrows are illustrated. The joystick or arrow key button is to be operated by a hand of an operator to perform panning or tilting of the electric camera platform 2. The camera platform/camera control interface 7 is used to allow mutual communication between the operation device 3 and the camera 1 with the electric camera platform 2 in an existing communication format. The mode switching button 8 functions as a switcher between the normal mode and tracking mode. In the normal mode, the operator uses the operation device 3 as a normal operation device without tracking operation. In the tracking mode, the operator uses the operation device 3 as an operation device for tracking.

The CPU 5 is adapted to switch the functions of the operation portion 9 and the operation button 10 in accordance with the set mode. In this embodiment, the mode switching is achieved by pressing and holding one of the existing buttons. Therefore, it is not necessary to provide an additional operation button for mode switching. The operation button 10 is also implemented using one of the existing buttons, and the functions of the operation button 10 are switched by the CPU 5 according to the selected mode or the order of pressing. In this embodiment, the three functions including the function of turning on/off auto focusing, the object selecting function of selecting the object S to be tracked and the output position setting function of setting the output position of the object S in the image are allotted to the operation button 10.

Figure 3:
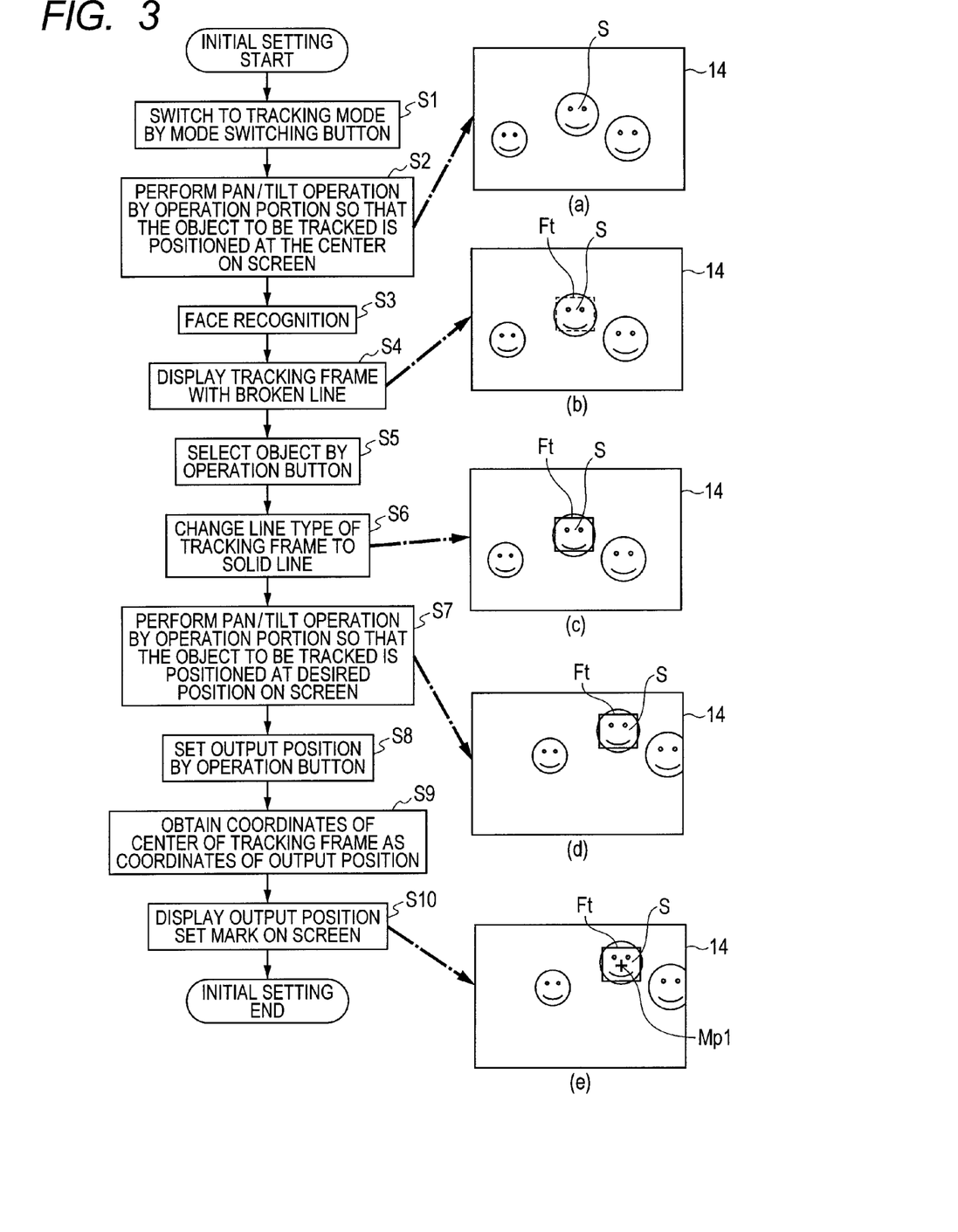
FIG. 3 includes a flow chart of a process before the start of tracking and images on a monitor screen according to the first embodiment.

FIG. 3 includes a flow chart of a control method in the initial setting procedure in which the object S to be tracked is selected, the selected object S is output at a set position in the image (on the screen), and tracking is started. FIG. 3 also includes exemplary images on the monitor screen associated with several steps in the flow chart. Specifically, FIG. 3 includes the flow chart made up of process steps S1 to S10 and images (a) to (e) on the screen of the monitor 14 associated with several steps.

When enabling tracking, the operator firstly presses the mode switching button 8 shown in FIG. 1 to set the tracking mode (step 1). Then, the operator causes the electric camera platform 2 to pan or tilt using the operation portion 9, thereby moving the object S to be tracked to the vicinity of the center of the screen of the monitor 14 as shown in image (a) (step S2). If a face is recognized (step S3), the tracking object frame Ft is displayed around the face by broken lines as shown in image (b) (step S4). If the object S to be tracked is the object S highlighted by the tracking object frame Ft, the selection of this object S is accepted by pressing the operation button 10 (which constitutes the tracking object setting unit) (step S5). Then, the tracking object frame Ft is displayed by solid lines as shown in image (c) (step S6). The object to be tracked is thus selected in the process up to step S6.

Then, the operator causes the electric camera platform 2 to pan or tilt again using the operation portion 9, thereby shifting the object S to be tracked to the position on the screen at which the object S is to be output (i.e. displayed) as shown in image (d) (step S7). Lastly, as the operator presses the operation button 10 (step S8), the CPU 5 obtains the coordinates C1 of the center of the tracking object frame Ft as the output position coordinates Op1, which will be the coordinates of the output position set mark Mp1 (step S9). Then, the output position set mark Mp1 is displayed or superimposed at the output position coordinates Op1 in the picked-up image as shown in image (e) (step S10). The position in the picked-up image at which the object to be tracked is to be output is set by executing the process up to step S10.

Figure 4:
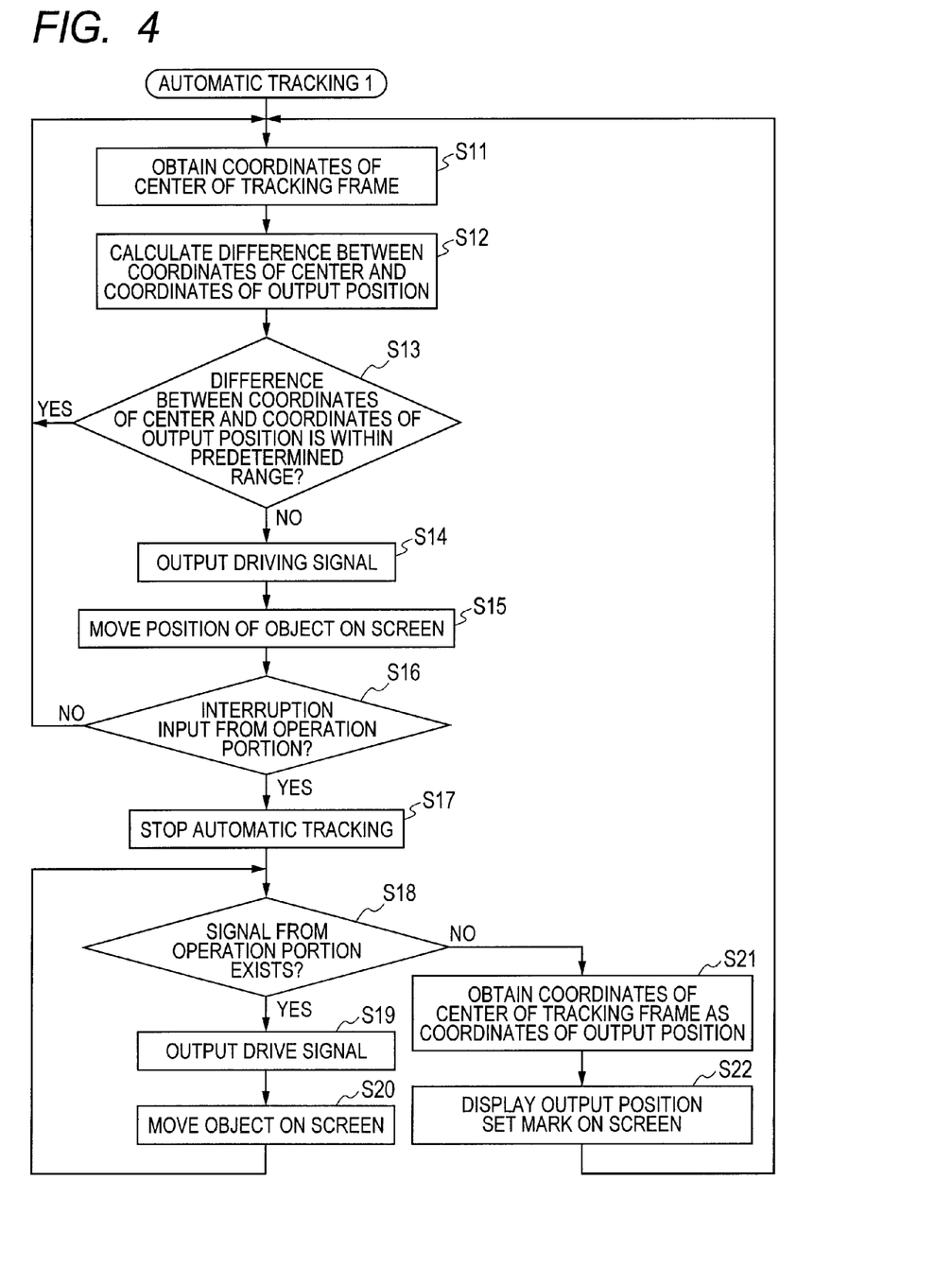
FIG. 4 is a flow chart of a process during tracking and resetting of the output position according to the first embodiment.

FIG. 4 is a flow chart of automatic tracking after completion of the above-described initial setting shown in FIG. 3, namely after completion of the step of setting the output position, in which resetting of the output position of the object S to be tracked in the image is performed. Firstly, the control computing portion 13 of the CPU 5 obtains the coordinates C1 of the center of the tracking object frame Ft in the image on the monitor screen (step S11). Then, the control computing portion 13 of the CPU 5 calculates the difference between the coordinates C1 of the center of the tracking object frame Ft and the output position coordinates Opt (step S12). If it is found by the calculation (step S13) that there is a substantial difference between the coordinates C1 and the coordinates Op1, a driving signal (or a camera platform/camera control signal) for controlling and driving the camera 1 and the electric camera platform 2 in such a way as to nullify the difference is output (step S14). In consequence, the position of the object S on the screen can be shifted by controlling at least one of zooming for varying the focal length of the camera 1, panning of the electric camera platform 2 and tilting of the electric camera platform 2 (step S15). Then, if the operator does not input an interrupt using the operation portion 9 (step 16), the process returns to step S11, and steps S11 to S16 are executed repeatedly. The process of steps S11 to S16 constitutes the automatic tracking. In this embodiment, a predetermined range is set for the difference between the coordinates C1 of the center and the coordinates Op1 of the output position, and the driving signal is not output if the difference falls within the predetermined range. The predetermined range is provided to prevent a situation in which even a little difference therebetween leads to the operation of the electric camera platform 2 and/or zooming to cause frequent motions of the image on the screen that lead to degradation in viewability.

Next, a case in which the position of the object S to be tracked on the screen is changed to a desired position and reset at that position during tracking will be described. If the operator operates the operation portion 9, the control computing portion 13 determines that an interrupt input is made (step S16) and stops the tracking operation (step S17), namely stops the process of steps S11 to step S16. Then, the control computing portion 13 continues to determine whether or not a signal input from the operation portion 9 exists (step S18). If a signal input from the operation portion 9 exists, a driving signal for panning or tilting the electric camera platform 2 is output (step S19) to shift the position of the object S on the screen to a newly set position (step S20). In step S19, it is determined that the signal input does not exist when a center point signal of the joystick is input to the control computing portion 13. Therefore, the driving signal is output in step S20 and steps S18 to S20 are repeatedly executed until the center point signal of the joystick is input to the control computing portion 13. The determination that the signal input does not exist may be made when the signal from the operation portion 9 has not changed for a specific period of time instead of when the center point signal is input.

The operation portion 9 has both the function of the output position setting unit that sets the output position and the function of the output position resetting unit that resets the output position.

With the above-described steps, the output position of the object S can be reset to an arbitrary position on the screen as desired. Lastly, if the control computing portion 13 determines that the signal input from the operation portion 9 does not exists (step S18), the process proceeds to step S21, where the coordinates C1 of the center of the tracking object frame Ft are obtained again as the coordinates Op1 of the output position. Then in step S22, the output position mark is displayed on the screen, and the process returns to step S11 to restart automatic tracking.

(Second Embodiment)

Figure 5:
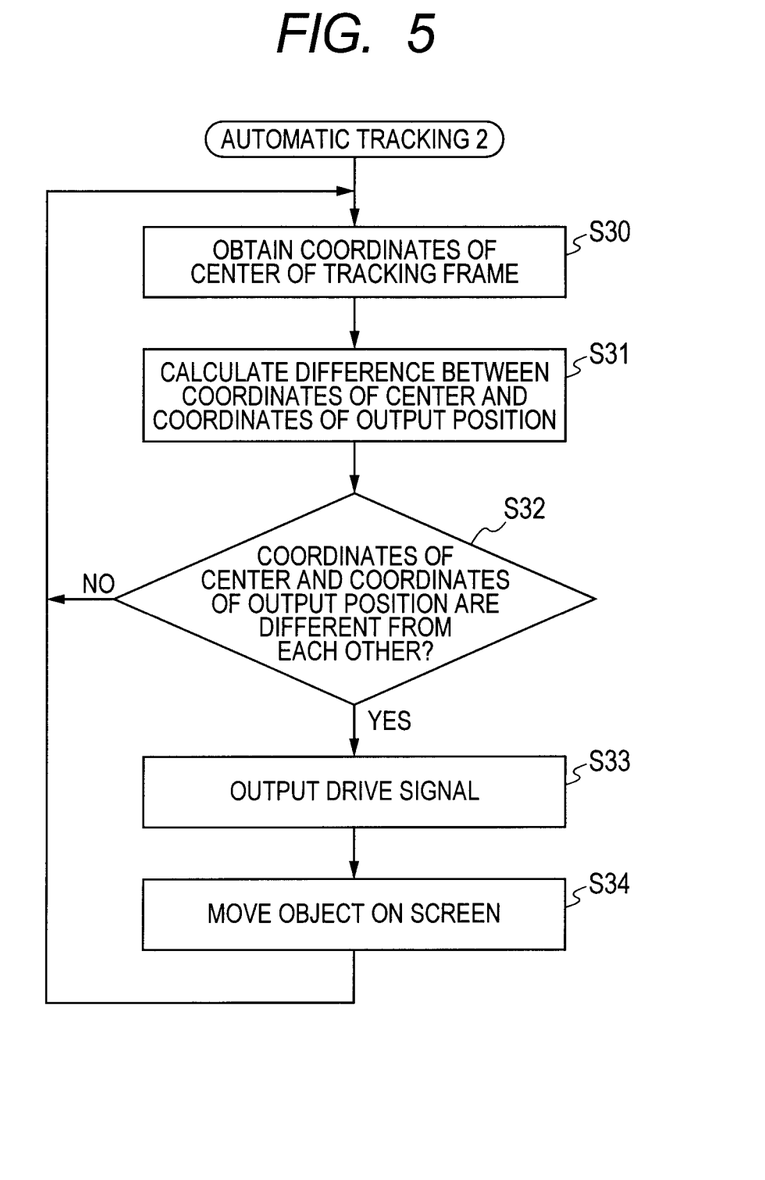
FIG. 5 is a flow chart of a process according to a second embodiment.

FIG. 5 is a flow chart of control by a control apparatus of a camera apparatus having the pan and/or tilt function according to a second embodiment. The second embodiment differs from the first embodiment in the way of resetting the output position of the object S to be tracked. The process of initial setting such as the step of setting the output position before starting tracking is the same as that in the first embodiment described with reference to FIG. 3 and will not be described here.

Figure 6:
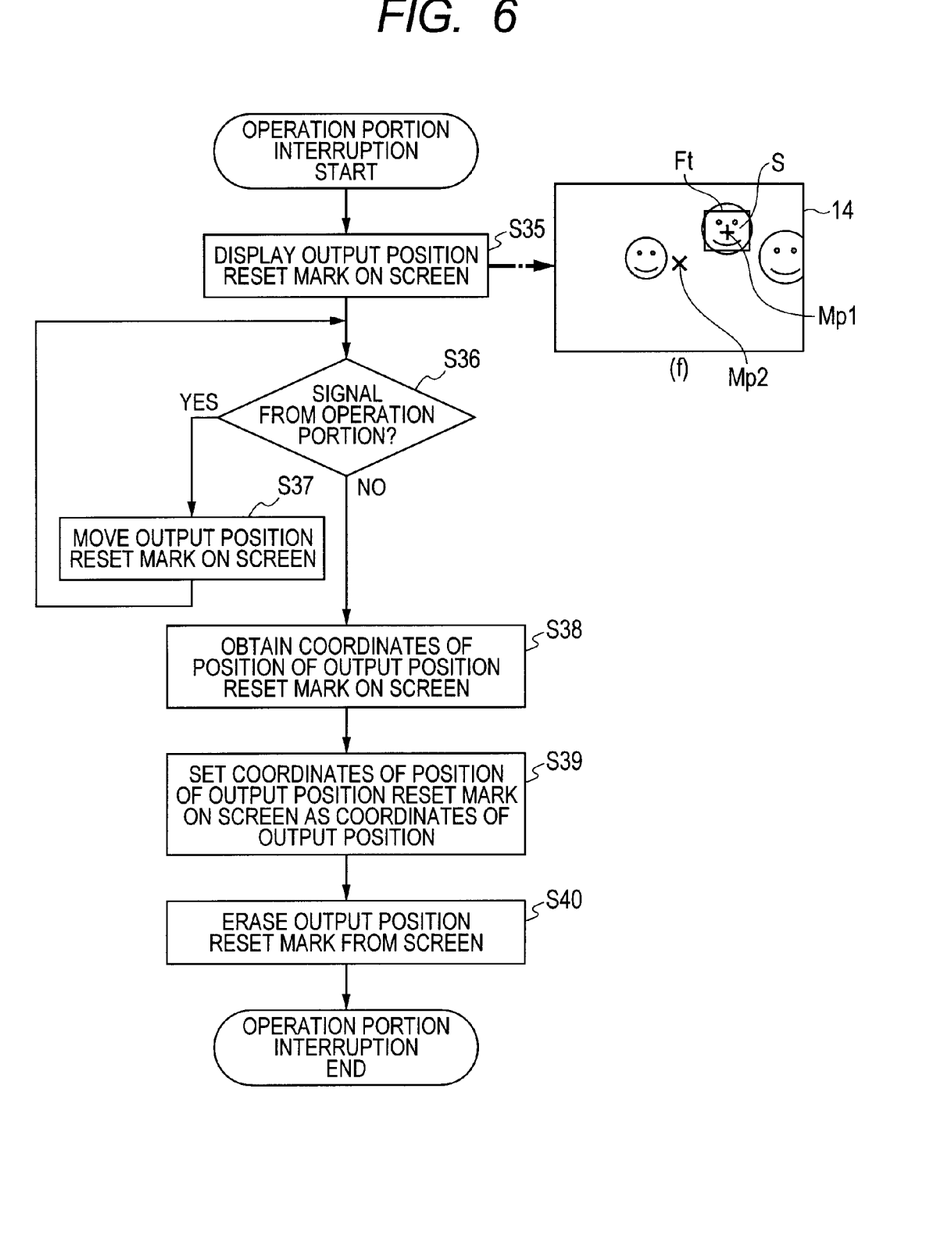
FIG. 6 includes a flow chart of an interrupt service routine and images on the monitor screen according to the second embodiment.

After completion of the initial setting, automatic tracking is performed according to automatic tracking 2 shown in FIG. 5 in this embodiment. This process (steps S30 to S34) replaces the process of steps S11 to S15 in FIG. 4 in the first embodiment. The process of automatic tracking 2 in this embodiment differs from the process of automatic tracing 1 in the first embodiment in that even when the operation portion 9 is operated during the automatic tracking, the control computing portion 13 continues the process of automatic tracking of the object to be tracked in steps S30 to S34 without making a determination like that in step S16 in FIG. 4 in the first embodiment as to whether an interrupt is input or not (FIG. 5). Specifically, while the automatic tracking process is continued according to the process of automatic tracking 2 shown in FIG. 5, an interrupt service routine shown in FIG. 6 is started, whereby an output position reset mark Mp2 is displayed on the screen as shown in image (f) (step S35). The control computing portion 13 continues to make a determination as to whether a signal input from the operation portion 9 exists or not (step S36). If a signal input exists, the control computing portion 13 causes the output position reset mark Mp2 to shift (step S37). When the signal input from the operation portion 9 stops after the output position reset mark Mp2 has been shifted to a desired position by the operation of the operation portion 9 (step S36), the coordinates of the output position reset mark Mp2 on the screen are obtained (step S38). Thus, the coordinates of the output position reset mark Mp2 are newly set as the output position coordinates Op1 (step S39). Lastly, the output position reset mark Mp2 is erased from the screen (step S40), and the operation portion interrupt service routine is terminated. Thereafter, the automatic tracking 2 is restarted according to the process of steps from S30 onward, and the object S is output at the position of the new output position coordinates. While in this embodiment, the output position set mark Mp1 and the output position reset mark Mp2 are differentiated by their shapes, they may be differentiated by their colors.

In the first embodiment, the operation portion 9 is operated to disable tracking and then to pan or tilt the electric camera platform 2, thereby shifting the object S to a desired output position on the screen again. In the second embodiment, while tracking is continuously performed, the output position reset mark Mp2 is displayed, and the operator is allowed to shift the output position reset mark Mp2 on the display screen using the operation portion 9 and to set it at a desired position. Then, the object S is shifted to that position and automatic tracking is continuously performed.

In the process according to this embodiment, when the object S is moving at high speed, only the output position reset mark MP2 is shifted using the operation unit 9. This is advantageous when the object S is moving at high speed.

(Third Embodiment)

Figure 7:
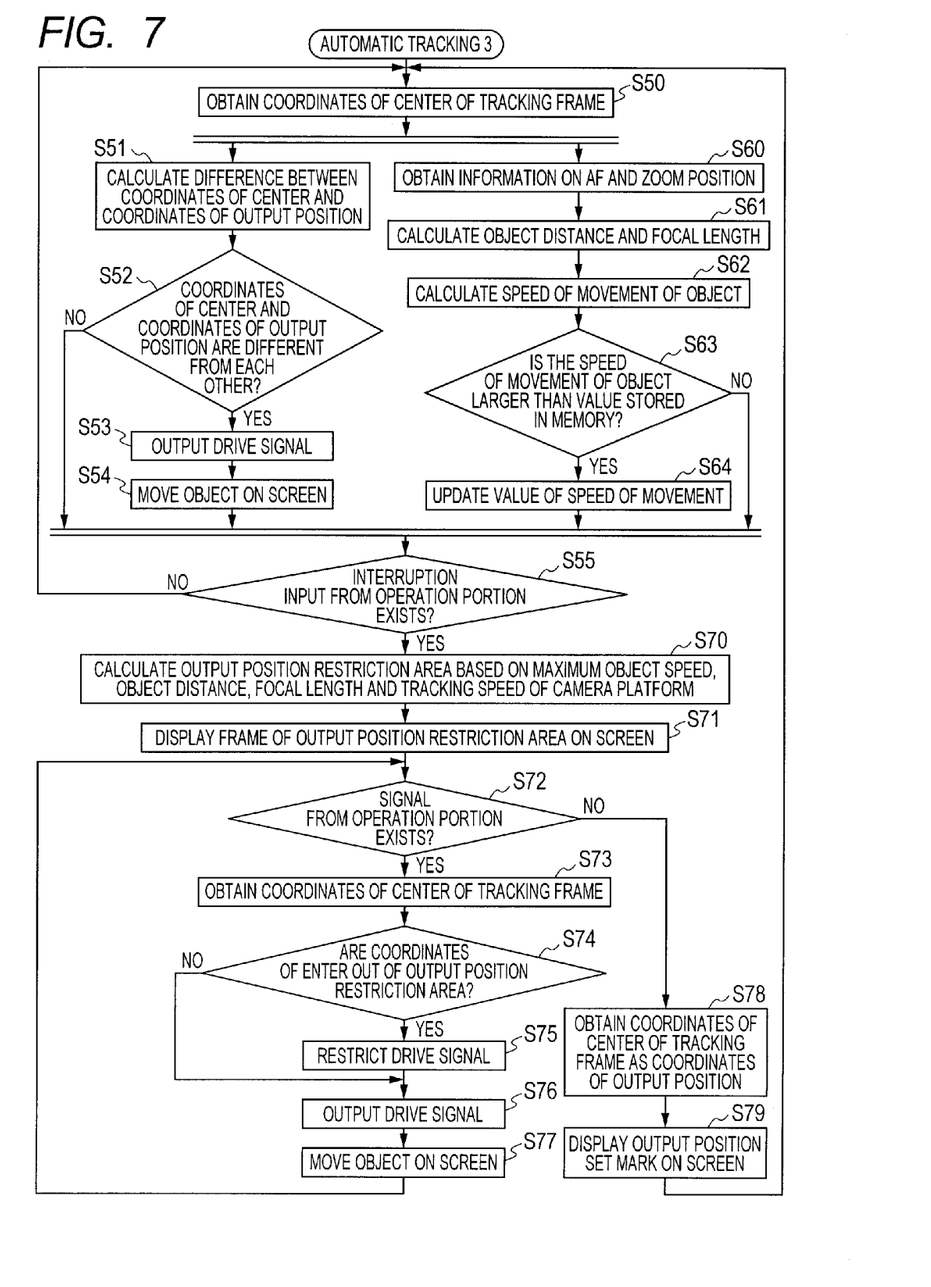
FIG. 7 is a flow chart of a process according to a third embodiment.

FIG. 7 is a flow chart of control by a control apparatus of a camera apparatus having the pan and/or tilt function according to a third embodiment. The process of initial setting such as the step of setting the output position before starting tracking is the same as that in the first embodiment described with reference to FIG. 3 and will not be described here.

In the first and second embodiments, the position of the object S to be tracked can be reset to an arbitrary position by operating the operation portion 9. However, if the position at which the object S to be tracked is to be output is set at a position near the edge of the screen, a little movement of the object S to be tracked might lead to the disappearance of it from the screen to disable tracking in some cases. This may occur depending on the object distance (i.e. the distance from the camera 1 to the object S), the zoom position, and the speed of movement of the object S. In view of this, in the third embodiment the area on the screen in which the output position can be reset is restricted based on the object distance, the zoom position (or the focal length or the angle of field) and the speed of movement of the object to be tracked.

Steps S50 to S55 are the same as steps S11 to S16 in FIG. 4 described in the first embodiment. After step S50 is executed, the steps S51 to S54 and the steps S60 to S64, which will be described in the following, are processed in parallel.

In step S50, the coordinates C1 of the center of the tracking object frame Ft are obtained. The CPU 5 obtains the auto focus information (focus information) and zoom position information of the camera 1 through the camera platform/camera control interface 7 and inputs them into the control computing portion 13 (step S60). The control computing portion 13 calculates the object distance and the focal length based on the obtained information (step S61).

Then, the control computing portion 13, which serves as the object speed computing unit, calculates the speed of movement of the object S (the object speed) from the results of calculation in steps S51 and S61, namely from the distance between the position of the coordinates C1 of the center and the output position set mark Mp1 (which represents the amount of movement of the tracked object in the picked-up image), the focal length and the object distance. Then, it is determined whether the calculated value of the speed of movement is larger than a value stored in a memory (which constitutes the maximum object speed memorizing unit) in the CPU 5 or not (step S63). If the calculated value of the speed of movement is larger than the stored value, the value of the speed of movement is updated (step S64). Thus, the highest speed of movement (i.e. the maximum object speed) defined as the largest value of the speed of movement of the object S can be stored. If in step S63 the value of the speed of movement calculated in step S62 is smaller than the value stored in the memory, the process proceeds to step S55. In this embodiment, the human walking speed is stored as the initial value in the memory. Then, steps S50 to S55 and steps 60 to 64 are executed repeatedly until an interrupt signal is input from the operation potion 9. While in this exemplary embodiment, steps S50 to S55 and steps 60 to 64 are executed in parallel to make the processing speed higher, the present invention is not limited by this. They may be executed in series.

Next, a description will be made of a case in which a signal from the operation portion 9 is input to the control computing portion 13 of the CPU 5 to reset the output position of the object S on the screen. As a signal is input to the control computing portion 13 from the operation portion 9, tracking is suspended as with step S18 in FIG. 4 in the first embodiment, and the process proceeds from step S 55 to step S70.

In step S70, the control computing portion 13, which serves as the restriction area setting unit, calculates an output position restriction area that restricts the area in which the position at which the object is to be displayed on the screen can be set, based on the maximum speed of movement of the object S stored in the memory, the focal length of the lens in the camera 1 obtained in step S60, the object distance obtained in step S61, the tracking speed determined by the panning speed and tilting speed (which are known design specifications) of the electric camera platform 2. The higher the maximum speed of movement of the object S is, the longer the focal length (the smaller the angle of field) of the lens apparatus is, the shorter the object distance is, and the slower the tracking speed of the electric camera platform 2 is, the smaller the output position restriction area is set to be and the nearer to the center of the screen the output position restriction area is set to be. The output position restriction area is set in the central portion of the screen. Conversely, the slower the maximum speed of movement of the object S is, the shorter the focal length (the larger the angle of field) of the lens apparatus is, the longer the object distance is, and the higher the tracking speed of the electric camera platform 2 is, the larger the output position restriction area is set to be. Since the maximum speed of movement of the object S is calculated only over a specific period during which automatic tracking is performed, it is preferred to multiply the maximum speed of movement by a certain factor so as to make it larger by a certain margin.

Figure 8:
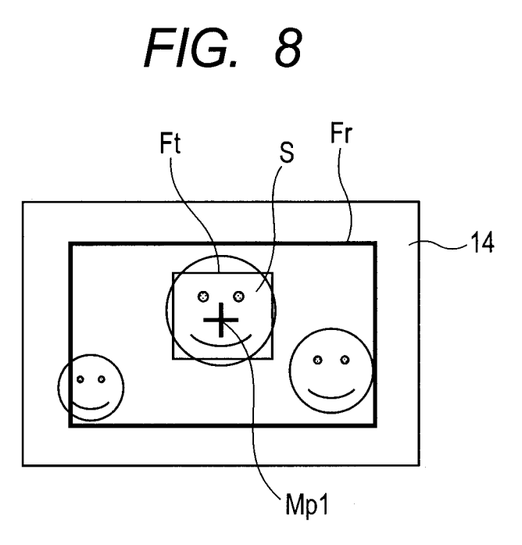
FIG. 8 shows an image on the monitor screen in which an output position restriction area is displayed.

The frame Fr of the output position restriction area is displayed on the screen as sown in FIG. 8 (step S71). The control computing portion 13 is continuously making a determination as to whether a signal from the operation portion 9 exists or not (step S72). If the input exists, the coordinates C1 of the center of the tracking object frame Ft are obtained in step S73. Then, a determination is made as to whether the coordinates C1 of the center fall out of the frame Fr of the output position restriction area (step S74). If the coordinates C1 of the center fall within the frame Fr of the output position restriction area, a drive signal for panning or tilting the electric camera platform 2 is output (step S76), thereby moving the object S (step S77). If the coordinates C1 of the center fall out of the frame Fr of the output position restriction area, a restriction is placed on the drive signal (step S75), and the drive signal is output (step S76). Specifically, in a situation in which panning or tilting will lead to the deviation of the coordinates C1 of the center from the frame Fr of the output position restriction area, the drive signal for panning or tilting is set to be zero to prevent the output position from being set at a position outside the frame Fr of the output position restriction area. By executing the above-described process of steps S72 to S77, the output position of the object S can be moved to and reset at a desired position in the frame Fr of the output position restriction area.

If it is determined in step S72 that a signal from the operation portion 9 does not exist, the process proceeds to step S78, where the coordinates C1 of the center of the tracking object frame Ft are obtained as the output position coordinates Op1 again. Then in step S79, the output position set mark is displayed on the screen, and the process returns to step S50 to restart automatic tracking.

While in this embodiment, the frame Fr of the output position restriction area is used in the step of resetting the output position in the process in the first embodiment, the frame Fr of the output position restriction area may be used in the step of resetting the output position in the process in the second embodiment. In the latter case, the frame Fr of the output position restriction area is used for restriction in shifting the output position reset mark Mp2 in the second embodiment.

In the third embodiment, by calculating the maximum speed of movement of the object and calculating the output position restriction area, the speed of movement of the object S is detected and the output position is restricted in such a way as to fall within the output position restriction area. Therefore, automatic tracking will not fail. In other words, storing the maximum speed of movement of the object to be tracked in advance enables setting the output position restriction area with which the object can be kept within the picked-up image while being tracked at the tracking speed achievable by the electric camera platform even when the object moves at the maximum movement speed, even if the angle of field and the object distance have been changed by requirements in image pickup. Alternatively, tables stating the human walking speed and the human running speed etc. may be stored in the CPU 5 in advance, and the output position restriction area may be calculated selectively using the tables.

The output position restriction area is determined based on the comparison of the speed of movement of the object in the picked-up image and the tracking speed determined by the panning speed and tilting speed of the electric camera platform 2. Specifically, the output position restriction area is calculated based on the comparison of the tracking speed (or rotating angle per unit time) of the electric camera platform 2 and the speed of movement of the object to be tracked in the picked-up image (or the angular velocity about the automatic tracking camera). Therefore, in step S70, the control computing portion 13 (which serves as the on-screen speed computing unit) calculates the speed of movement of the object in the picked-up image (or the angular velocity about the automatic tracking camera) based on the stored maximum speed of movement of the object, the focal length and the object distance and calculates the output position restriction area based on the speed of movement of the object and the tracking speed determined by the panning speed and the tilting speed of the electric camera platform 2 (i.e. the tracking speed according to design specifications or the maximum tracking speed).

As described above, since it is possible that the object to be tracked moves at the maximum speed of movement of the object stored in the memory even when the object to be tracked moves at low speed at a short object distance, the output position restriction area is set taking into account the maximum speed of movement of the object. Thus, the object to be tracked can be kept in the picked-up image with improved reliability.

While in the first to third embodiments, the control apparatuses for automatic tracking camera have been described, the present invention can also be applied to automatic tracking camera systems or the like. Specifically, the present invention can be applied to automatic tracking camera systems having all of the camera 1, the electric camera platform 2 and the operation device 3 shown in FIG. 1. It is desirable that the systems be equipped with a display unit like the monitor 14 for viewing images picked up by the camera 1.

The automatic tracking camera systems may have a camera 1, a camera platform 2 on which the camera 1 is mounted and an operation device 3. The Operation device 3 has the output position setting unit for setting the position on the screen at which the object to be tracked is output. A control computing unit is adapted to control the electric camera platform 2 on which the camera 1 is mounted in such a way that the image of the object S to be tracked is output at a position reset by the output position setting unit during tracking. While the output position setting unit is described above to have the function as the output position resetting unit, the present invention is not limited by this feature. The output position setting unit and the output position resetting unit may be provided as separate units. While in the embodiments the output position setting unit is provided in the operation device 3, the output position setting unit may be provided on the camera body, the taking lens attached to the camera 1, or the operation device for remote operation. The output position setting unit may be provided in a display portion having a touch panel to allow the operator to touch the image of the object to be tracked on the panel to shift it on the display portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-093636, filed Apr. 20, 2011, which is hereby incorporated by reference herein in its

What is claimed is:

1. An automatic tracking control apparatus for a camera apparatus having a panning or tilting function, comprising:
   an object recognition unit configured to recognize an object in a picked-up image from the camera apparatus;
   a tracking object setting unit configured to set the object recognized by the object recognition unit as an object to be tracked;
   an output position setting unit configured to set an output position on a monitor screen, which is a first position in the picked-up image on the monitor screen at which an image of the object to be tracked is to be displayed;
   a control computing unit configured to output to the camera apparatus a drive signal for driving the camera apparatus to pan or tilt in such a way that the object to be tracked is displayed at the output position set by the output position setting unit; and
   an image output unit configured to output an image in which an indication for distinguishing the object to be tracked from another object is superimposed on the picked-up image,
   wherein after automatic tracking of the object to be tracked has started, when at least one of the panning and tilting functions is manually performed during automatic tracking of the object to be tracked, the control computing unit suspends the automatic tracking of the object to be tracked, drives the camera apparatus according to the manually-performed panning and/or tilting to change the first position of the object to be tracked in the picked-up image on the monitor screen to a second position in the picked-up image on the monitor screen, allows the output position setting unit to set the second position of the object to be tracked in the picked-up image as an updated output position, and then restarts the automatic tracking by outputting, to the camera apparatus, a drive signal for driving the camera apparatus in such a way that the object to be tracked is displayed at the updated output position.

2. The automatic tracking control apparatus according to claim 1, further comprising:
   an on-screen speed computing unit configured to calculate the speed of movement of the object to be tracked in the picked-up image; and
   a restriction area setting unit configured to set a restriction area in which the output position reset by the output position resetting unit can fall based on the panning and tilting speeds of the camera apparatus and the speed of movement obtained by the on-screen speed computing unit,
   wherein the image output unit further superimposes the restriction area on the picked-up image when outputting the image.

3. The automatic tracking control apparatus according to claim 2, further comprising:
   an object speed computing unit configured to calculate an object speed, which is the speed of movement of the object to be tracked, based on the focal length of the camera apparatus, the object distance of the object to be tracked obtained based on focus information of the camera apparatus, and the amount of movement of the object to be tracked in the picked-up image; and
   a maximum object speed memorizing unit configured to memorize the highest value of the object speed as maximum object speed,
   wherein the on-screen speed computing unit calculates the speed of movement of the object to be tracked based on the focal length of the camera, the object distance of the object to be tracked and the maximum object speed, and the restriction area setting unit sets the restriction area based on the speed of movement of the object to be tracked obtained based on the maximum object speed and the panning and tilting speeds of the camera apparatus.

4. The automatic tracking control apparatus according to claim 1, wherein when the distance between the output position and the position of the object to be tracked in the picked-up image is larger than a predetermined threshold, the control computing unit outputs to the camera apparatus a drive signal for driving the camera apparatus to pan or tilt.

5. The automatic tracking control apparatus according to claim 1, further comprising an operation unit configured to operate the panning or the tilting function,
   wherein when the operation unit is operated during automatic tracking, the control computing unit:
   suspends automatic tracking;
   drives the camera apparatus in accordance with an operation of the operation unit to change the position of the object to be tracked in the picked-up image; and
   when a predetermined signal is input from the operation unit or a signal from the operation unit does not change for a predetermined period of time, sets the position of the object to be tracked in the picked-up image as an updated output position and then outputs a drive signal for the camera apparatus to the camera apparatus so that the object to be tracked is positioned at the updated output position in the picked-up image.

6. An automatic tracking control apparatus for a camera apparatus having a panning or tilting function, comprising:
   an object recognition unit configured to recognize an object in a picked-up image from the camera apparatus;
   a tracking object setting unit configured to set the object recognized by the object recognition unit as an object to be tracked;
   an output position setting unit configured to set an output position on a monitor screen, which is a first position in the picked up image on the monitor screen at which an image of the object to be tracked is to be displayed;
   a control computing unit configured to output to the camera apparatus a drive signal for driving the camera apparatus to pan or tilt in such a way that the object to be tracked is displayed at the output position set by the output position setting unit;
   an image output unit configured to output an image in which an indication for distinguishing the object to be tracked from another object and a mark to be used to reset the first position are superimposed on the picked-up image, the mark being superimposed on the picked-up image at a second position different from the first position; and
   an output position resetting unit configured to shift the second position of the mark in the picked-up image on the monitor screen to a third position in the picked-up image on the monitor screen and to set the third position of the mark on the monitor screen as an updated output position,
   when the output position resetting unit sets the updated output position during automatic tracking, the control computing unit outputs to the camera apparatus a drive signal for driving the camera apparatus in such a way that the image of the object to be tracked is displayed at the updated output position.

7. An automatic tracking camera system comprising:
a camera apparatus having a panning or tilting function;
an automatic tracking control apparatus connected to the camera apparatus, the automatic tracking control apparatus for a camera apparatus having a panning or tilting function, comprising:
an object recognition unit configured to recognize an object in a picked-up image from the camera apparatus;
a tracking object setting unit configured to set the object recognized by the object recognition unit as an object to be tracked;
an output position setting unit configured to set an output position on a monitor screen, which is a first position in the picked-up image on the monitor screen at which an image of the object to be tracked is to be displayed;
a control computing unit configured to output to the camera apparatus a drive signal for driving the camera apparatus to pan or tilt in such a way that the object to be tracked is displayed at the output position set by the output position setting unit; and
an image output unit configured to output an image in which an indication for distinguishing the object to be tracked from another object is superimposed on the picked-up image,
wherein after automatic tracking of the object to be tracked has started, when at least one of the panning and tilting functions is manually performed during automatic tracking of the object to be tracked, the control computing unit suspends the automatic tracking of the object to be tracked, drives the camera apparatus according to the manually-performed panning and/or tilting to change the first position of the object to be tracked in the picked-up image on the monitor screen to a second position in the picked-up image on the monitor screen, allows the output position setting unit to set the second position of the object to be tracked in the picked-up image as an updated output position, and then restarts the automatic tracking by outputting, to the camera apparatus, a drive signal for driving the camera apparatus in such a way that the object to be tracked is displayed at the updated output position; and
a display unit connected to the automatic tracking control apparatus to display an image output from the image output unit of the automatic tracking control apparatus.

8. An automatic tracking camera system comprising:
a camera apparatus having a panning or tilting function;
an automatic tracking control apparatus connected to the camera apparatus, the automatic tracking control apparatus for a camera apparatus having a panning or tilting function, comprising:
an object recognition unit configured to recognize an object in a picked-up image from the camera apparatus;
a tracking object setting unit configured to set the object recognized by the object recognition unit as an object to be tracked;
an output position setting unit configured to set an output position on a monitor screen, which is a first position in the picked up image on the monitor screen at which an image of the object to be tracked is to be displayed;
a control computing unit configured to output to the camera apparatus a drive signal for driving the camera apparatus to pan or tilt in such a way that the object to be tracked is displayed at the output position set by the output position setting unit;
an image output unit configured to output an image in which an indication for distinguishing the object to be tracked from another object and a mark to be used to reset the first position are superimposed on the picked-up image, the mark being superimposed on the picked-up image at a second position different from the first position; and
an output position resetting unit configured to shift the second position of the mark in the picked-up image on the monitor screen to a third position in the picked-up image on the monitor screen and to set the third position of the mark on the monitor screen as an updated output position,
when the output position resetting unit sets the updated output position during automatic tracking, the control computing unit outputs to the camera apparatus a drive signal for driving the camera apparatus in such a way that the image of the object to be tracked is displayed at the updated output position; and
a display unit connected to the automatic tracking control apparatus to display an image output from the image output unit of the automatic tracking control apparatus.

* * * * *